United States Patent
Okamoto (10) Patent No.: US 9,776,522 B2
(45) Date of Patent: Oct. 3, 2017

(54) WIRELESS POWER SUPPLY SYSTEM AND POWER TRANSMISSION DEVICE

(71) Applicant: NISSAN MOTOR CO., LTD., Yokohama-shi, Kanagawa (JP)

(72) Inventor: Tomofumi Okamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 14 days.

(21) Appl. No.: 15/023,777

(22) PCT Filed: Sep. 26, 2013

(86) PCT No.: PCT/JP2013/076045
§ 371 (c)(1),
(2) Date: Mar. 22, 2016

(87) PCT Pub. No.: WO2015/045058
PCT Pub. Date: Apr. 2, 2015

(65) Prior Publication Data
US 2016/0214488 A1    Jul. 28, 2016

(51) Int. Cl.
*H01F 27/42* (2006.01)
*H01F 37/00* (2006.01)
(Continued)

(52) U.S. Cl.
CPC ............ *B60L 11/182* (2013.01); *H02J 5/005* (2013.01); *H02J 7/0029* (2013.01); *H02J 7/025* (2013.01);
(Continued)

(58) Field of Classification Search
CPC .. H02J 50/80; H02J 50/10; H02J 5/005; H02J 7/025; H02J 17/00; H04B 5/0037; H01F 38/14; B60L 11/182
(Continued)

(56) References Cited

U.S. PATENT DOCUMENTS 8,380,377 B2    2/2013  Lim et al.
9,536,655 B2 *  1/2017  Ichikawa ............... H02J 5/005
(Continued)

FOREIGN PATENT DOCUMENTS

JP    2009-022122 A    1/2009
JP    2009-273219 A    11/2009
(Continued)

*Primary Examiner* — Carlos Amaya
(74) *Attorney, Agent, or Firm* — Foley & Lardner LLP (57) ABSTRACT

A wireless power supply system includes a power transmission device provided on a ground side and a power receiving device mounted on a vehicle, the power transmission device transmitting, to the power receiving device via a wireless connection, electric power controlled by an inverter circuit, wherein the power receiving device transmits a power supply command signal to the power transmission device in a first cycle by use of a radio signal. The power transmission device includes a power transmission coil current detection means for detecting a power transmission coil current flowing through a power transmission coil and controls an output voltage of the inverter circuit based on the power supply command signal and the power transmission coil current detected by the power transmission coil current detection means in a second cycle shorter than the first cycle.

10 Claims, 6 Drawing Sheets

(51) Int. Cl.
*H01F 38/00* (2006.01)
*B60L 11/18* (2006.01)
*H02J 17/00* (2006.01)
*H02J 5/00* (2016.01)
*H02J 7/00* (2006.01)
*H02J 7/02* (2016.01)
*H02J 50/12* (2016.01)
*H02J 50/80* (2016.01)

(52) U.S. Cl.
CPC .............. *H02J 17/00* (2013.01); *H02J 50/12* (2016.02); *H02J 50/80* (2016.02); *H02J 2007/0037* (2013.01)

(58) Field of Classification Search
USPC ........................................................ 307/104
See application file for complete search history.

(56) References Cited

U.S. PATENT DOCUMENTS

| 2009/0015210 A1 | 1/2009 | Kojima |
| 2011/0118917 A1 | 5/2011 | Lim et al. |
| 2012/0299391 A1 | 11/2012 | Tanabe |
| 2014/0203774 A1 | 7/2014 | Sawayanagi et al. |
| 2015/0028688 A1 | 1/2015 | Masaoka |

FOREIGN PATENT DOCUMENTS

| JP | 2010-028934 A | 2/2010 |
| JP | 2012-249364 A | 12/2012 |
| JP | 5116904 B1 | 1/2013 |
| JP | 2013-141360 A | 7/2013 |
| KR | 10-2011-0054152 A | 5/2011 |
| WO | WO 2013/046391 A1 | 4/2013 |

\* cited by examiner

RELATIONSHIP BETWEEN TIME-OUT PERIOD AND SOC

FIG. 7

POWER COMMAND AND TIME AFTER TIME-OUT PERIOD

WIRELESS POWER SUPPLY SYSTEM AND POWER TRANSMISSION DEVICE

TECHNICAL FIELD

The present invention relates to a wireless power supply system and a power transmission device for supplying, via a wireless connection, electric power transmitted from a ground side to a power receiving device mounted on a vehicle.

BACKGROUND ART

There are known wireless power supply systems for supplying electric power and charging batteries mounted on electric vehicles via a wireless connection without use of plugs for power supply. A wireless power supply system includes a power transmission coil provided in a power transmission device on the ground side and a power receiving coil provided in a power receiving device mounted on a vehicle and facing the power transmission coil so as to supply electric power from the power transmission coil to the power receiving coil via a wireless connection. The wireless power supply system is required to regulate the electric power output from the power transmission device depending on a state of charge of a battery installed in the power receiving device. Patent Literature 1 describes such a system configured to transmit a signal of a power supply command from a power receiving device to a power transmission device and select one of power supply devices based on the transmitted signal.

CITATION LIST

Patent Literature

Patent Literature 1: Japanese Patent No. 5116904

SUMMARY OF INVENTION

Patent Literature 1 describes wireless communication between the power transmission device and the power receiving device performed in a long cycle in order to stabilize the communication therebetween. However, the long-cycle communication may cause an excess or deficiency of power transmission toward the power receiving device because the control signal transmitted via the long-cycle communication cannot deal with a situational change in the system such as a sudden change in relative impedance caused by a change of a gap between a power transmission coil and a power receiving coil.

The present invention has been made in view of the conventional problem described above. An object of the present invention is to provide a wireless power supply system and a power transmission device capable of transmitting electric power with high accuracy while dealing with a situational change suddenly caused.

A wireless power supply system according to an aspect of the present invention includes a power transmission device provided on a ground side and having a power transmission coil and a power receiving device mounted on a vehicle and having a power receiving coil, the power transmission device transmitting, to the power receiving device via a wireless connection, electric power controlled by an inverter provided in the power transmission device, the power receiving device transmits a power supply command signal to the power transmission device in a first cycle by use of a radio signal, and the power transmission device includes a power transmission coil current detection means for detecting a power transmission coil current flowing through the power transmission coil, and controls an output voltage of the inverter based on the power supply command signal and the power transmission coil current detected by the power transmission coil current detection means in a second cycle shorter than the first cycle.

A power transmission device according to an aspect of the present invention is provided on a ground side and having a power transmission coil for transmitting, via a wireless connection, electric power controlled by an inverter to a power receiving device provided on a vehicle and having a power receiving coil, and includes a power transmission coil current detection means for detecting a power transmission coil current flowing through the power transmission coil, receiving a power supply command signal transmitted from the power receiving device in a first cycle, and controlling an output voltage of the inverter based on the power supply command signal and the power transmission coil current detected by the power transmission coil current detection means in a second cycle shorter than the first cycle.

DESCRIPTION OF EMBODIMENTS

Hereinafter, embodiments of the present invention will be explained with reference to the drawings.

First Embodiment

Figure 1:
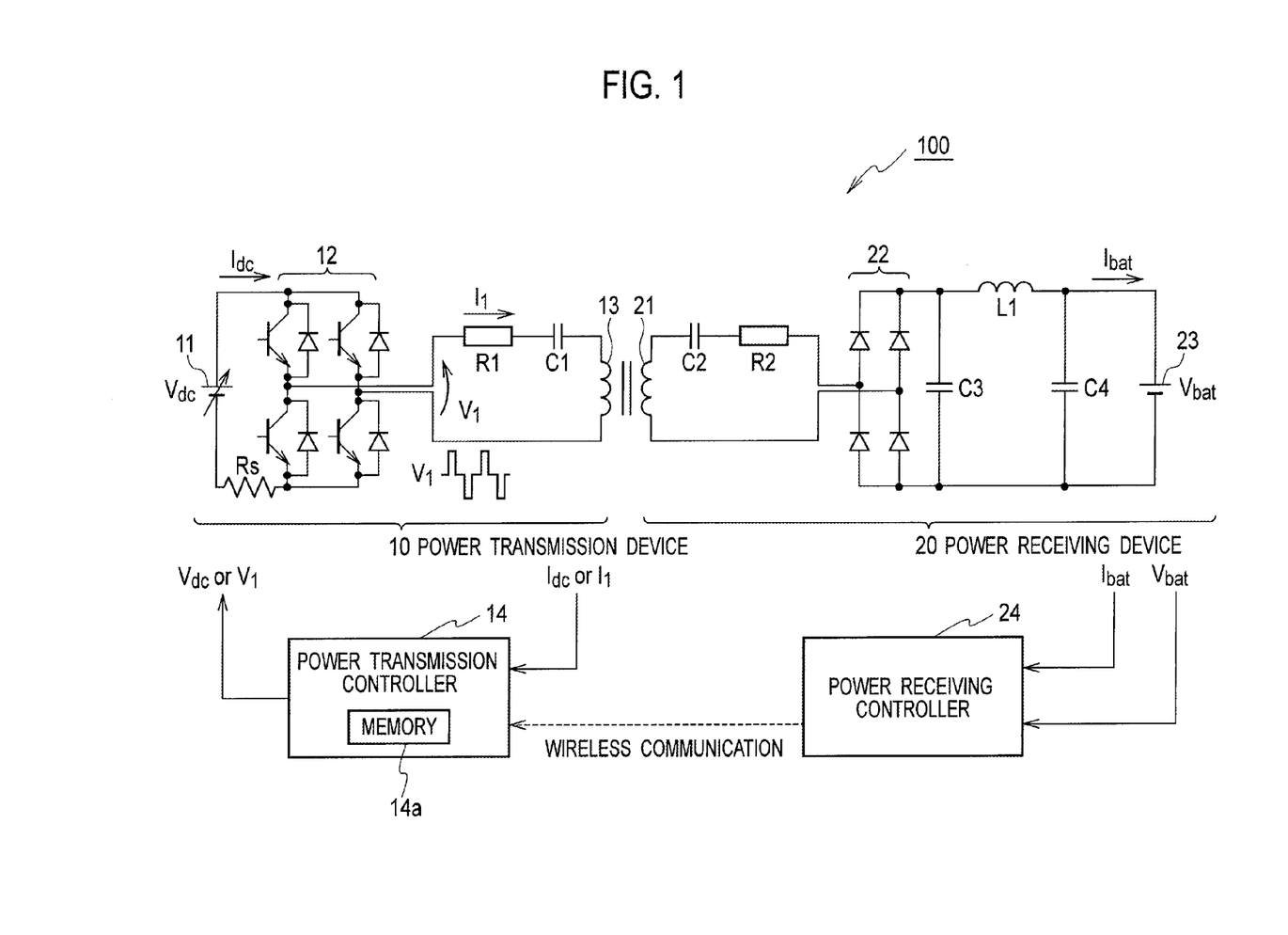
FIG. 1 is a circuit diagram showing a configuration of a wireless power supply system according to an embodiment of the present invention.

FIG. 1 is a circuit diagram showing a configuration of a wireless power supply system according to a first embodiment of the present invention. As shown in FIG. 1, the wireless power supply system 100 according to the present embodiment is configured to supply electric power via a wireless connection to a battery mounted on a vehicle so as to charge the battery therewith, and includes a power transmission device 10 provided on the ground side and a power receiving device 20 provided on the vehicle.

The power transmission device 10 includes a DC power source 11 for outputting DC voltage obtained in such a manner as to control a power source (not shown in the drawing) by smoothing and an increase/decrease in voltage, an inverter circuit 12 for converting the DC voltage output from the DC power source 11 into AC voltage, and a power transmission coil 13 connected to the inverter circuit 12 on the output side. A resistor R1 and a capacitor C1 for noise removal are provided between the inverter circuit 12 and the power transmission coil 13. A shunt resistor Rs (current sensor) for measuring current supplied to the inverter circuit 12 is provided between the DC power source 11 and the inverter circuit 12. The power transmission device 10 further includes a power transmission controller 14 for controlling the operation of the power transmission device 10.

The DC power source 11 includes, for example, a DC/DC converter capable of varying output voltage in accordance with a control signal output from the power transmission controller 14. The inverter circuit 12 includes four semiconductor switches such as IGBTs. The inverter circuit 12 converts the DC voltage output from the DC power source 11 into the AC voltage in such a manner as to turn on/off the respective semiconductor switches at a constant frequency in a constant duty ratio according to a drive signal output from the power transmission controller 14.

The power receiving device 20 includes a power receiving coil 21, and a capacitor C2 and a resistor R2 for noise removal connected to the power receiving coil 21. The power receiving device 20 further includes a bridge rectifying circuit 22 for converting the AC voltage received by the power receiving coil 21 into DC voltage, a capacitor C3 for smoothing the DC voltage obtained by rectification, and a coil L1 and a capacitor C4 for suppressing current. The power receiving device 20 further includes a battery 23 charged with electric power and a power receiving controller 24 for controlling the operation of the power receiving device 20.

Several kinds of data communication can be performed between the power transmission controller 14 and the power receiving controller 24 by use of radio signals. When receiving a power supply command value P* (power supply command signal) transmitted from the power receiving controller 24, the power transmission controller 14 regulates the transmission of the electric power based on the power supply command value P*. In particular, the power transmission controller 14 controls output voltage Vdc of the DC power source 11 and adjusts AC voltage V1 (inverter output voltage) output from the inverter circuit 12 so as to regulate the electric power transmitted by the power transmission coil 13. In this case, since the output voltage Vdc of the DC power source 11 is in proportion to the AC voltage V1, the voltage Vdc may be used as the inverter output voltage.

As described below, since the power transmission controller 14 and the power receiving controller 24 communicate with each other in first cycle T1, the power transmission controller 14 receives a new power supply command value P* in each cycle T1 so as to control the output voltage based on the received power supply command value P*. The power transmission controller 14 includes a memory 14a (storage section) for storing the power supply command value P* transmitted from the power receiving controller 24.

The power transmission controller 14 also detects current Idc flowing into the input side of the inverter circuit 12, namely, power transmission coil current, so as to control the voltage Vdc or V1 based on the detected current Idc. As described below, the voltage Vdc or V1 is controlled based on the current Idc in second cycle T2 (here, T2<T1).

Since the current I1 flowing through the power transmission coil is in proportion to the current Idc flowing into the input side of the inverter circuit 12, the power transmission controller 14 may detect the current I1 flowing through the circuit of the power transmission coil 13 as the power transmission coil current, instead of the current Idc, so as to control the voltage Vdc or V1 based on the detected current I1.

The power receiving controller 24 obtains charge voltage Vbat of the battery 23 and current Ibat flowing into the battery 23, generates a power supply command value P* based on the charge voltage Vbat and the current Ibat, and transmits the power supply command value P* to the power transmission controller 14 via wireless communication. The power receiving controller 24 may also be configured to transmit the charge voltage Vbat and the current Ibat to the power transmission controller 14 so that the power supply command value P* is requested by the power transmission controller 14 based on the transmitted charge voltage Vbat and current Ibat.

In the state where the power transmission device 10 is provided on the ground side and the power receiving device 20 is provided on the vehicle, a driver of the vehicle moves the vehicle so that the power receiving coil 21 is opposed to the power transmission coil 13. Once the electric power is supplied to the power transmission coil 13 in the state where the power receiving coil 21 faces the power transmission coil 13, the electric power is transmitted to and received by the power receiving coil 21 so that the battery 23 is charged therewith. Thus, the electric power can be transmitted from the power transmission device 10 to the power receiving device 20 to charge the battery 23 with the electric power via a wireless connection.

Here, the power transmission controller 14 and the power receiving controller 24 may be configured, for example, as an integrated computer including a central processing unit (CPU) and storage means such as a RAM, a ROM and a hard disk.

Next, the specific configurations of the power transmission controller 14 and the power receiving controller 24 are explained below with reference to the block diagram shown in FIG. 2.

Figure 2:
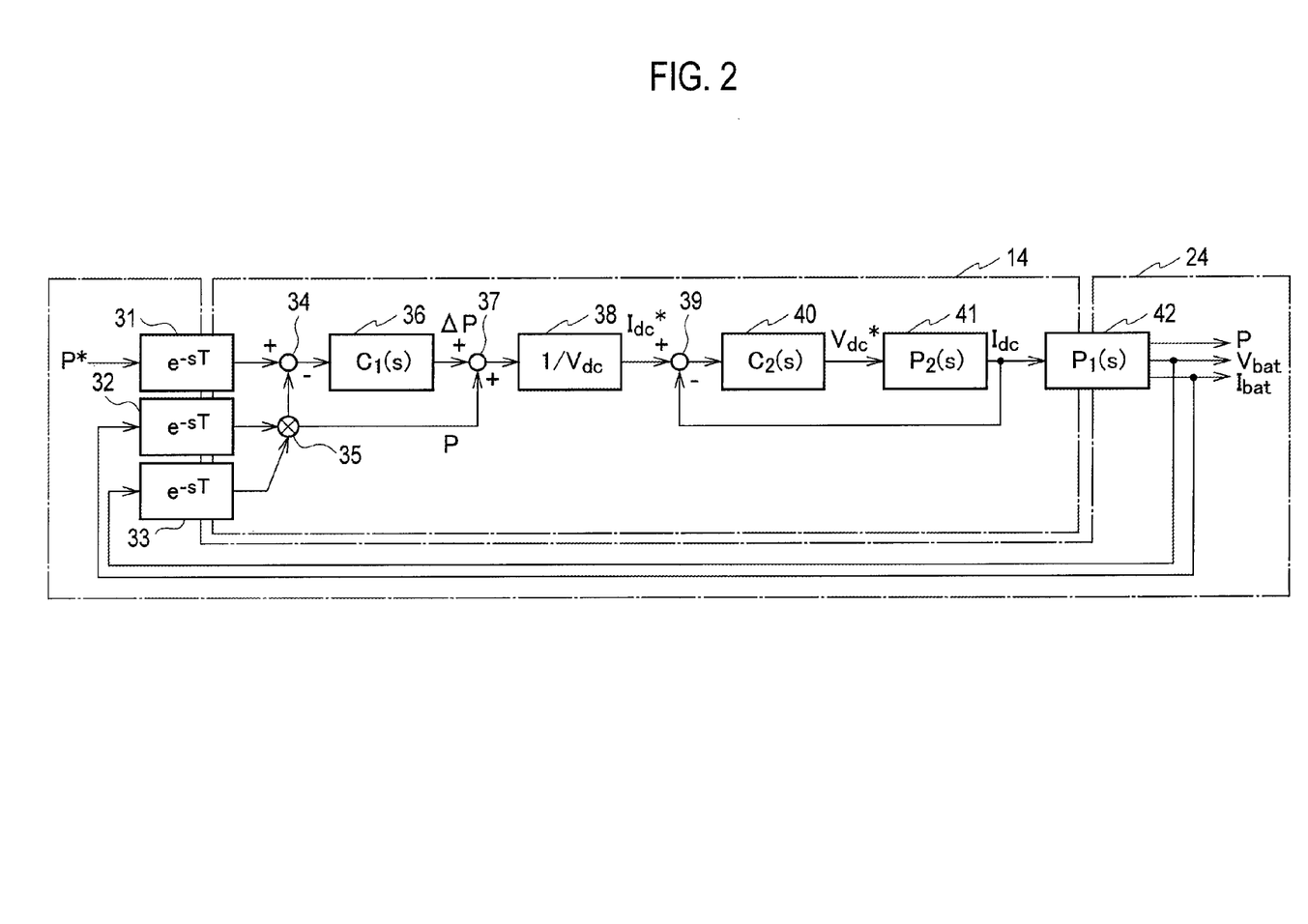
FIG. 2 is a block diagram showing specific configurations of a power transmission controller and a power receiving controller in the wireless power supply system according to the embodiment of the present invention.

As shown in FIG. 2, the power transmission controller 14 includes a PI control block 36 having a transfer function C1(s), a control block 38 having a transfer function 1/Vdc, a PI control block 40 having a transfer function C2(s), a control model 41 of the inverter circuit 12 having a transfer function P2(s), and a control model 42 of a wireless power transmission unit including the power transmission coil 13 and the power receiving coil 21 and having a transfer function P1(s).

The power receiving controller 24 includes first order lag elements 32, 33 provided on feedback paths of the voltage Vbat and the current Ibat output from the control model 42 to the power transmission controller 14. The power receiving controller 24 further includes a first order lag element 31 provided on a feedback path of the power supply command value P.

In particular, the power supply command value P* output from the power receiving controller 24 is supplied to a subtractor 34 provided in the power transmission controller 14 via the first order lag element 31. Data of the voltage Vbat of the battery 23 (FIG. 1) is supplied to a multiplier 35 via the first order lag 33. Data of the current Ibat flowing through the battery 23 is supplied to the multiplier 35 via the first order lag element 32. The multiplier 35 multiplies the voltage Vbat and the current Ibat together to obtain an electric power measurement value P. The electric power measurement value P is supplied to the subtractor 34 and an adder 37. The subtractor 34 subtracts the electric power measurement value P from the power supply command value P* to obtain a deviation. The deviation thus obtained is multiplied by the transfer function C1(s) in the PI control block 36 to obtain a deviation ΔP. The adder 37 adds the electric power measurement value P to the deviation ΔP, and the value obtained by the addition is multiplied by 1/Vdc in the control block 38. As a result, a current command value Idc* is obtained. Here, the electric power measurement value P may be obtained by the power receiving controller 24, and the obtained electric power measurement value P may be transmitted to the power transmission controller 14 via wireless communication.

The current command value Idc* is supplied to a subtractor 39, and the subtractor 39 subtracts a current Idc output from the control model 41 from the current command value Idc*. The value obtained by the subtraction is multiplied by the transfer function C2(s) in the PI control block 40 to obtain a voltage command value Vdc*. The voltage command value Vdc* is multiplied by the transfer function P2(s) in the control model 41 to obtain the current Idc so as to be output to the control model 42. The current Idc is also fed back to the subtractor 39. The control model 42 multiplies the input current Idc by the transfer function P1(s) and outputs the value thus obtained.

As understood from the configurations described above, the wireless power supply system 100 according to the present embodiment includes two loops: a first loop in which Vbat and Ibat are fed back from the power receiving controller 24 to the power transmission controller to correct the power supply command value P* in each first cycle T1; and a second loop in which the current Idc output from the control model 41 is fed back so as to correct the voltage Vdc. The sampling cycle T2 in the second loop is shorter than the sampling cycle T1 in the first loop.

Next, the operation of the wireless power supply system 100 according to the present embodiment is explained with reference to the flowchart shown in FIG. 3 and the timing chart shown in FIG. 4. First, the process starts power transmission from the power transmission device 10 to the power receiving device 20 in step S1.

In step S2, the power transmission device 10 starts communicating with the power receiving device 20 provided in the vehicle. In step S3, the power transmission controller 14 provided in the power transmission device 10 determines whether the second cycle T2 has passed, and executes the feedback control of the second loop in step S4 when the second cycle T2 has passed. As shown in FIG. 2, this feedback control performed is based on the deviation between the current Idc output from the control model 41 and the current command value Idc*. Therefore, the feedback control is executed only in the power transmission device 10 so as to adjust the voltage V1 to an appropriate value supplied to the power transmission coil 13.

In step S5, it is determined whether the power transmission controller 14 and the power receiving controller 24 are communicating with each other, and the process proceeds to step S6 when the communication is confirmed. When the power transmission controller 14 and the power receiving controller 24 are not communicating with each other, namely, when the communication therebetween is cut off, the process proceeds to step S11.

In step S6, the power transmission controller 14 reads the power supply command value P* transmitted from the power receiving controller 24. The memory 14a stores the read power supply command value P*. At the same time, each data of the charge voltage Vbat of the battery 23 and the current Ibat flowing through the battery 23 is transmitted to the power transmission controller 14.

In step S7, a time-out period (denoted by t1) depending on a SOC of the battery 23 is determined based on the power supply command value P* stored in the memory 14a. The SOC can be obtained based on the charge voltage Vbat and the current Ibat of the battery 23. The time-out period t1 represents a time for which the power supply from the power transmission device 10 to the power receiving device 20 can be continued after the communication between the power transmission controller 14 and the power receiving controller 24 is cut off.

Figure 6:
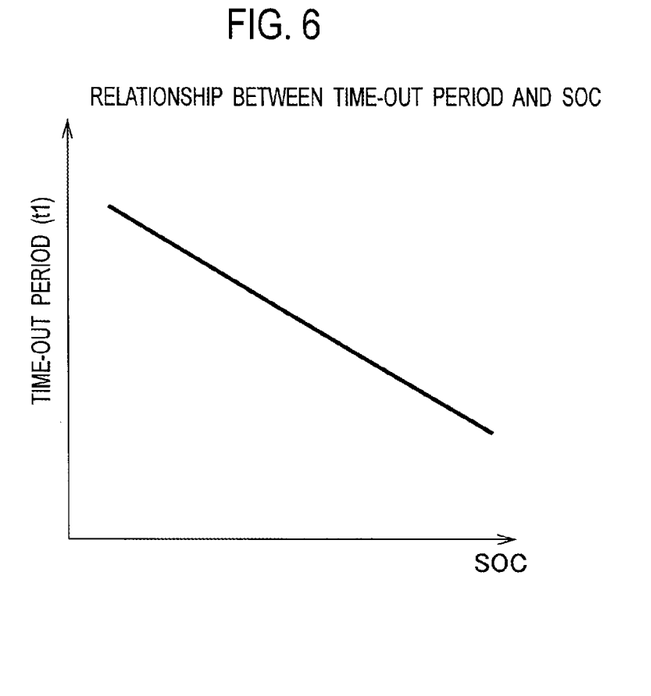
FIG. 6 is a characteristic diagram showing a relationship between a SOC and a time-out period in the wireless power supply system according to the embodiment of the present invention.

The time-out period t1 is determined depending on the SOC of the battery 23, for example, in such a manner as to shorten as the level of the SOC is higher, as shown in FIG. 6. The time-out period t1 is a lapse of time after the communication between the power transmission controller 14 and the power receiving controller 24 is cut off. If the power transmission is continued in a state where the level of the SOC is high after the communication is cut off, the battery 23 may be overcharged because the electric power is supplied to the battery 23 excessively. Thus, the time-out period t1 is shortened when the level of the SOC is high so as to prevent such a problem. In particular, the power receiving controller 24 transmits measurement data of charge voltage of the battery 23 to the power transmission device 10 in the first cycle T1, and the power transmission controller 14 shortens the time-out period t1 as the charge voltage of the battery is higher based on the transmitted measurement data. The relationship between the SOC and the time-out period t1 is not limited to that as shown in the graph of FIG. 6 and may be configured such that the time-out period t1 is shortened continuously or gradually in association with an increase of the SOC.

Figure 3:
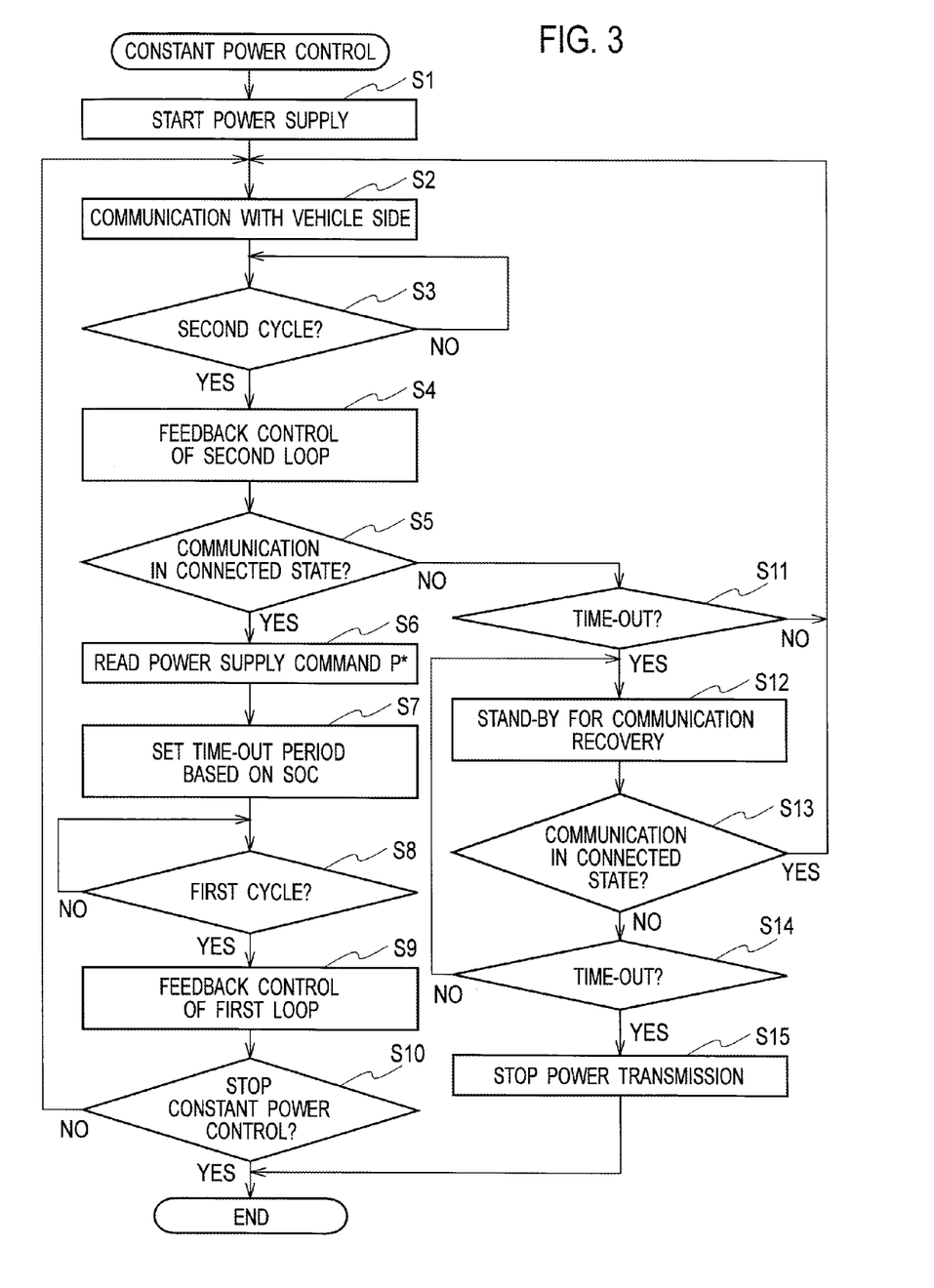
FIG. 3 is a flowchart showing a processing operation of the wireless power supply system according to a first embodiment of the present invention.

Next, in step S8 in FIG. 3, the power transmission controller 14 determines whether the first cycle T1 has passed. When the first cycle T1 has passed, the power transmission controller 14 executes the feedback control of the first loop in step S9. In particular, the voltage V1 supplied to the power transmission coil 13 is obtained based on the current Idc obtained by use of the shunt resistor Rs and the power supply command value P* in such a manner as to divide the power supply command value P* by the current Idc. Then, the control amount of the output voltage of the DC power source 11 is set to the voltage V1 thus obtained. Thus, a preferred electric power is transmitted from the power transmission coil 13 to the power receiving coil 21. Accordingly, the battery 23 provided in the power receiving device 20 can be charged with the preferred electric power.

In step S10, it is determined whether an operation of completing the constant power control is input, and the present process ends when the stop operation is input. In the processing from step S1 to S10, the feedback control of the first loop is executed in the first cycle T1, and the feedback control of the second loop is executed in the second cycle T2 shorter than the first cycle T1 so as to control the electric power transmitted from the power transmission coil 13.

In the processing in step S5, when the communication is not confirmed (NO in step S5), the power transmission controller 14 determines in step S11 whether the time-out period t1 set in the processing in step S7 has elapsed.

Namely, it is determined whether the time elapsed after the communication between the power transmission controller 14 and the power receiving controller 24 is cut off reaches the time-out period t1.

When the time-out period t1 has not elapsed yet (NO in step S11), the process returns to step S2. Since the memory 14a stores the power supply command value P* used in the previous feedback control of the first loop, the feedback control of the second loop in step S3 is executed based on the previously-used power supply command value P*.

Namely, when the power supply command value P* cannot be received via the current communication, the output power of the inverter circuit 12 is controlled by use of the power supply command value P* obtained via the previous communication and stored in the memory 14a. The following is a specific explanation thereof with reference to FIG. 4.

Figure 4:
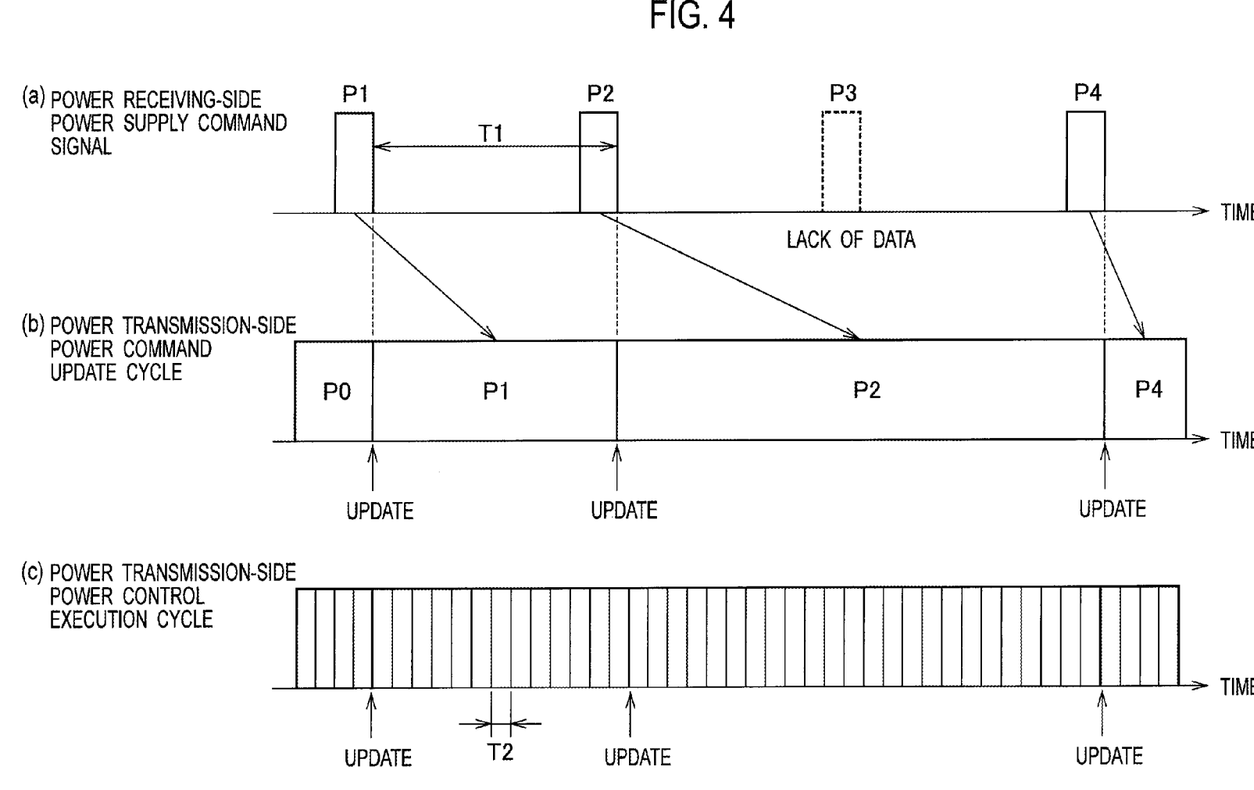
FIG. 4 is a timing chart showing data communication of a first loop and a second loop in the wireless power supply system according to the embodiment of the present invention.

The power receiving controller 24 transmits the power supply command value P* in the first cycle T1 (refer to FIG. 4(a)). The power transmission controller 14 receives the power supply command value P* and controls the voltage supplied to the power transmission coil 13. Further, the feedback control for the current I1 in the second loop is continued from the point where the previous power supply command value P* is received to the point where the current power supply command value P* is received, so as to control the voltage supplied to the power transmission coil 13 (refer to FIG. 4(c)).

Thus, every time the power supply command value P* of P1, P2, P3 and P4 in this order is received in the cycle T1 as shown in FIG. 4(a), the power supply command value P* stored in the memory 14a is updated, and the feedback control is executed therewith.

In a case where the power supply command value P3 is lacked because of a fault in communication, as shown in FIG. 4(a), that is, when the power transmission controller 14 cannot receive the power supply command value P3 transmitted from the power receiving controller 24, the feedback control is executed in such a manner as to continuously use the previously-received power supply command value P2. When it is determined that the time-out period t1 has elapsed in the process in step S1 in FIG. 3, the power transmission controller 14 is in a stand-by mode for a communication recovery.

In step S13, the power transmission controller 14 determines whether the communication with the power receiving controller 24 recovers. When it is determined that the communication recovers, it is then determined again in step S14 whether the time-out period t1 has elapsed, and the process returns to step S12 when the time-out period t1 has not elapsed yet. When the time-out period t1 has elapsed, the power transmission controller 14 then stops transmitting the electric power in step S15. That is, when the power transmission controller 14 cannot receive the power supply command value P*, the power transmission controller 14 calculates the lapse of time for which the power supply command value P* has not been received. When the lapse of time calculated reaches the predetermined time-out period t1, the transmission of the electric power is stopped.

The wireless power supply system 100 according to the first embodiment of the present invention performs the wireless communication between the power transmission controller 14 and the power receiving controller 24 as described above. The power receiving controller 24 transmits the power supply command value P* to the power transmission controller 14 in the first cycle T1. The power transmission controller 14 obtains the power supply command value P* and the current Idc detected in the shunt resistor Rs in the second cycle T2, obtains the voltage V1 supplied to the power transmission coil 13 based on the power supply command value P* and the current Idc, and controls the output voltage Vdc of the DC power source 11 to be set to the voltage V1 thus obtained or controls the drive of the inverter circuit 12.

Since the power supply command value P* is transmitted in the relatively long first cycle T1, the communication between the power receiving controller 24 and the power transmission controller 14 can be retried plural times when, for example, the communication therebetween is not in a stable state, so as to increase the stability of the communication from the power receiving controller 24 to the power transmission controller 14. Here, the transmission of the power supply command value P* in the relatively long first cycle T1 may not allow the system to immediately deal with a variation in relative impedance between the power transmission coil 13 and the power receiving coil 21 caused for a shorter period of time than the first cycle T1 to keep a constant level of the electric power transmitted. Thus, the system according to the present embodiment is configured such that the current I1 or Idc flowing through the power transmission coil 13 is detected in the second cycle T2 shorter than the first cycle T1 so as to control the output voltage of the inverter circuit 12 based on the power supply command value P* and the current I1 or Idc. Therefore, the system can keep the transmitted electric power at a constant level while immediately dealing with the variation of the relative impedance between the power transmission coil 13 and the power receiving coil 21 even when the positional relationship between the power transmission device 10 and the power receiving device 20 is suddenly changed and the relative impedance varies for a shorter period of time than the first cycle T1 in association with the rapid change of the positional relationship. Accordingly, the battery 23 provided in the power receiving device 20 can be charged with an appropriate electric power transmitted corresponding to the voltage and current of the battery 23.

Further, even when a fault in communication between the power transmission controller 14 and the power receiving controller 24 occurs and the communication therebetween is thus cut off, the power transmission controller 14 executes the feedback control for the current Idc based on the previously-transmitted power supply command value stored in the memory 14a (storage section). As a result, the system can promptly cope with a problem with the battery 23 of which charge is stopped so as to prevent trouble that the battery 23 has not been charged without the driver of the vehicle realizing it.

Further, the transmission of the electric power is stopped when the predetermined time-out period t1 has elapsed after the communication between the power transmission controller 14 and the power receiving controller 24 is cut off, so as to prevent the power transmission from being continued for a long period of time without the state of charge of the battery 23 confirmed. Accordingly, the battery 23 can be prevented from being overcharged.

Further, since the time-out period t1 is shortened as the level of the SOC (charge voltage) of the battery 23 is higher, the battery 23 can be prevented from being overcharged more reliably. When the communication between the power transmission controller 14 and the power receiving controller 24 is confirmed before the time-out period t1 has elapsed, the feedback control of the first loop is again carried out so as to continuously charge the battery 23 with the electric power.

Second Embodiment

Next, a second embodiment of the present invention is explained below. The configurations of the devices in the present embodiment are the same as those in the first embodiment, and explanations thereof are not repeated below. The second embodiment differs from the first embodiment in the processing after step S11 shown in FIG. 3. Hereinafter, an operation of the wireless power supply system according to the second embodiment is explained with reference to the flowchart shown in FIG. 5. Note that the same steps in the flowchart shown in FIG. 5 as those in FIG. 3 are denoted by the same reference signs.

Figure 5:
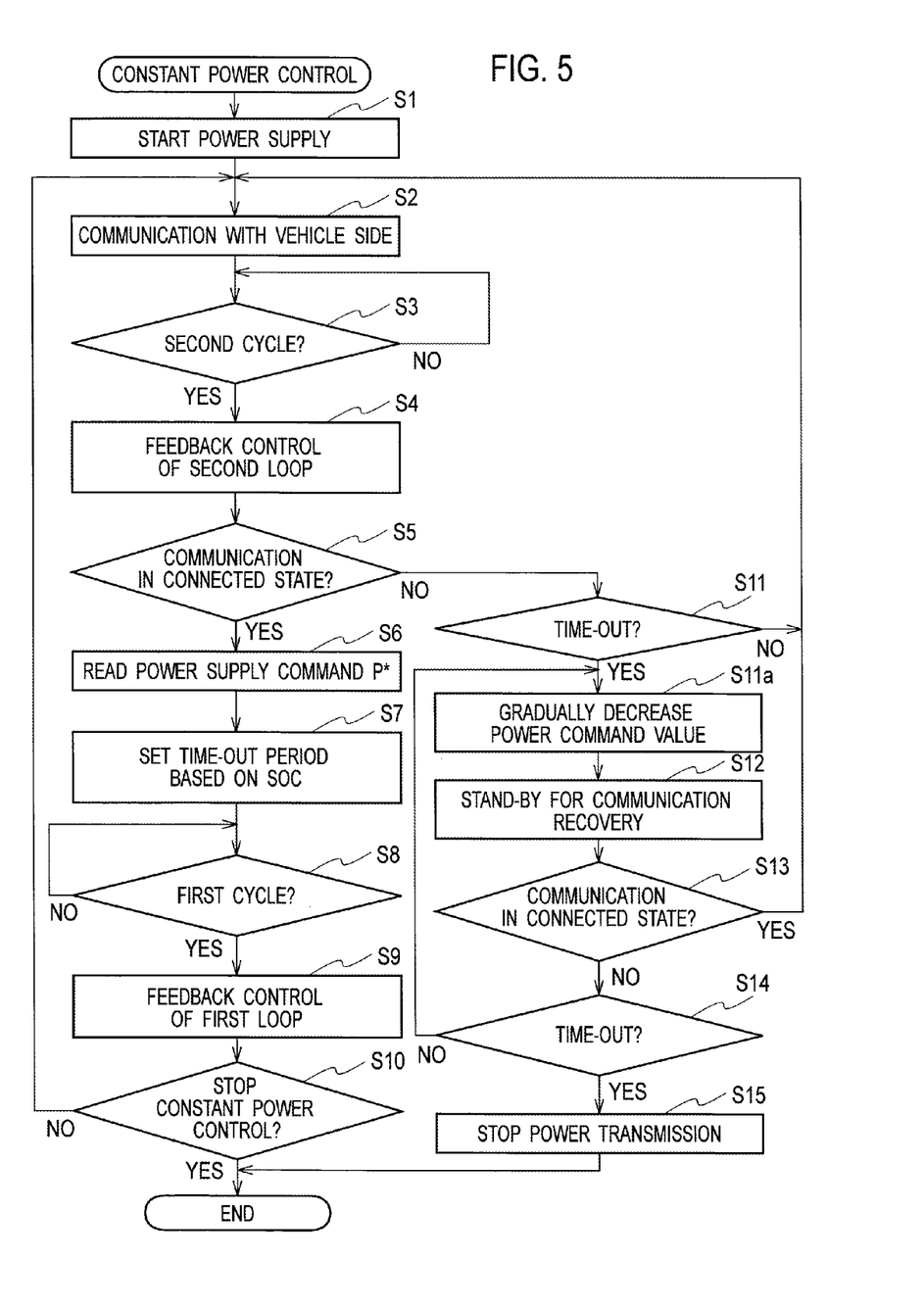
FIG. 5 is a flowchart showing a processing operation of the wireless power supply system according to a second embodiment of the present invention.

In step S5 in FIG. 5, when the power transmission controller 14 and the power receiving controller 24 are not communicating with each other (NO in step S5), the power transmission controller 14 determines in step S11 whether the time-out period t1 set in the processing in step S7 has elapsed. Namely, it is determined whether the time elapsed after the communication between the power transmission controller 14 and the power receiving controller 24 is cut off reaches the time-out period t1.

When the time-out period t1 has not elapsed yet (NO in step S11), the process returns to step S2. Since the memory 14a stores the power supply command value P* used in the previous feedback control of the first loop, the feedback control of the second loop in step S3 is executed based on the previously-used power supply command value P*.

Figure 7:
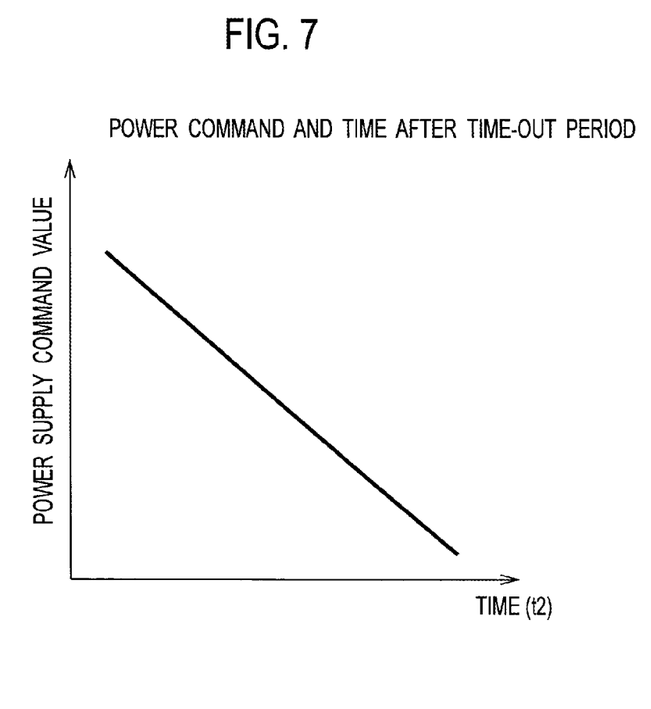
FIG. 7 is a characteristic diagram showing a relationship between a power supply command value and a lapse of time after a time-out period in the wireless power supply system according to the second embodiment of the present invention.

When it is determined that the time-out period t1 has elapsed (YES in step S11), the power transmission controller 14 gradually decreases the power supply command value P* in step S11a. Namely, when the power transmission controller 14 cannot receive the power supply command value P*, the power transmission controller 14 calculates the lapse of time for which the power supply command value P* has not been received, and the power transmission controller 14 gradually decreases the transmission amount of the electric power when the calculated time reaches the time-out period t1. A relationship between the power supply command value P* and the time by which the power supply command value P* is gradually decreased to reach zero (denoted by "t2") may be determined as shown in FIG. 7, for example. Namely, the time t2 is shortened as the power supply command value P* is larger.

In step S12, the power transmission controller 14 determines whether the communication with the power receiving controller 24 recovers. When it is determined that the communication recovers in step S13, it is then determined again in step S14 whether the time-out period t1 has elapsed, and the process returns to step S11a when the time-out period t1 has not elapsed yet. When the time-out period t1 has elapsed, the power transmission controller 14 then stops transmitting the electric power in step S15.

In the wireless power supply system according to the second embodiment of the present invention as described above, when the communication between the power transmission controller 14 and the power receiving controller 24 is cut off, the feedback control of the second loop is only executed for the predetermined time-out period t1 so as to continuously charge the battery 23. When the time-out period t1 has elapsed, the power transmission is not immediately stopped but continued while the power supply command value P* is gradually decreased. When the communication recovers during this period, the system returns to the normal control.

Namely, once the power transmission controller 14 receives the power supply command value P* while gradually decreasing the electric power to be transmitted, the power transmission controller 14 restarts regular transmission of the electric power by use of the received power supply command value P*.

As a result, the battery 23 can be prevented from unnecessary interruption of charge even when the time-out period t1 has elapsed. Further, since the power supply command value P* is gradually decreased, a rapid variation of the current flowing through the power transmission coil 13 or the power receiving coil 21 can be suppressed, so as to prevent surge noise caused by the rapid variation of the current.

Further, since the time t2 by which the power supply command value P* reaches zero is shortened as the power supply command value P* is larger, the battery 23 can be prevented from being overcharged more reliably.

Although the wireless power supply system and the power transmission device according to the present invention have been described above by way of the embodiments shown in the drawings, the present invention is not limited to the descriptions thereof, and the respective configurations can be replaced with optional ones having similar functions.

INDUSTRIAL APPLICABILITY

The present invention can be applicable to the case where power supply from a power transmission device to a power receiving device can be continued even when wireless communication between the power transmission device and the power receiving device is stopped.

REFERENCE SIGNS LIST

10 POWER TRANSMISSION DEVICE
11 DC POWER SOURCE
12 INVERTER CIRCUIT
13 POWER TRANSMISSION COIL
14 POWER TRANSMISSION CONTROLLER
14a MEMORY
20 POWER RECEIVING DEVICE
21 POWER RECEIVING COIL
22 RECTIFYING CIRCUIT
23 BATTERY
24 POWER RECEIVING CONTROLLER
24 SUBTRACTOR
35 MULTIPLIER
36 PI CONTROL BLOCK
37 ADDER
38 CONTROL BLOCK
39 SUBTRACTOR
40 PI CONTROL BLOCK
41 CONTROL MODEL
42 CONTROL MODEL
100 WIRELESS POWER SUPPLY SYSTEM

The invention claimed is:
1. A wireless power supply system comprising a power transmission device provided on a ground side and having a power transmission coil and a power receiving device mounted on a vehicle and having a power receiving coil, the power transmission device transmitting, to the power receiving device via a wireless connection, electric power controlled by an inverter provided in the power transmission device,
the power receiving device transmitting a power supply command signal to the power transmission device in a first cycle by use of a radio signal, the power transmission device including a storage section for storing the power supply command signal transmitted from the power receiving device and a power transmission coil current detection section for detecting a power transmission coil current flowing through the power transmission coil, wherein the power transmission device controls an output voltage of the inverter based on the power supply command signal and the power transmission coil current detected by the power transmission coil current detection section in a second cycle shorter than the first cycle, and the power transmission device controls the output voltage of the inverter by use of the power supply command signal previously transmitted and stored in the storage section when the power transmission device cannot receive another power supply command signal via current communication.

2. The wireless power supply system according to claim 1, wherein, when the power transmission device cannot receive the power supply command signal, the power transmission device calculates a lapse of time for which the power supply command signal has not been received, and stops transmitting the electric power when the lapse of time reaches a predetermined time-out period.

3. The wireless power supply system according to claim 2, wherein:

the power receiving device includes a battery charged with the electric power transmitted from the power transmission device and transmits measurement data of a charge voltage of the battery to the power transmission device in the first cycle; and the power transmission device shortens the time-out period as the charge voltage of the battery is higher based on the measurement data.

4. The wireless power supply system according to claim 1, wherein, when the power transmission device cannot receive the power supply command signal, the power transmission device calculates a lapse of time for which the power supply command signal has not been received, and gradually decreases a transmission amount of the electric power when the lapse of time reaches a predetermined time-out period.

5. The wireless power supply system according to claim 4, wherein, when the power transmission device receives the power supply command signal while gradually decreasing the transmission amount of the electric power, the power transmission device restarts regular transmission of the electric power by use of the received power supply command signal.

6. A power transmission device provided on a ground side and having a power transmission coil for transmitting, via a wireless connection, electric power controlled by an inverter to a power receiving device provided on a vehicle and having a power receiving coil, the power transmission device comprising a storage section for storing a power supply command signal transmitted from the power receiving device and a power transmission coil current detection section for detecting a power transmission coil current flowing through the power transmission coil, wherein the power transmission device receives the power supply command signal transmitted from the power receiving device in a first cycle, and controls an output voltage of the inverter based on the power supply command signal and the power transmission coil current detected by the power transmission coil current detection section in a second cycle shorter than the first cycle, and the power transmission device controls the output voltage of the inverter by use of the power supply command signal previously transmitted and stored in the storage section when the power transmission device cannot receive another power supply command signal via current communication.

7. The power transmission device according to claim 6, wherein, when the power transmission device cannot receive the power supply command signal, the power transmission device calculates a lapse of time for which the power supply command signal has not been received, and stops transmitting the electric power when the lapse of time reaches a predetermined time-out period.

8. The power transmission device according to claim 7, wherein the power transmission device receives data of a charge voltage of a battery provided in the power receiving device, and shortens the time-our period as the charge voltage is higher.

9. The power transmission device according to claim 6, wherein, when the power transmission device cannot receive the power supply command signal, the power transmission device calculates a lapse of time for which the power supply command signal has not been received, and gradually decreases a transmission amount of the electric power when the lapse of time reaches a predetermined time-out period.

10. The power transmission device according to claim 9, wherein, when the power transmission device receives the power supply command signal while gradually decreasing the transmission amount of the electric power, the power transmission device restarts regular transmission of the electric power by use of the received power supply command signal.

* * * * *